(12) United States Patent
Kasuya

(10) Patent No.: US 6,556,592 B1
(45) Date of Patent: Apr. 29, 2003

(54) CORRECTION METHOD FOR CLOCK SYNCHRONIZATION WITH ISDN IN CELL STATION FOR USE IN PRIVATE-NETWORK-USE PHS AND A CIRCUIT THEREFOR

(75) Inventor: Nobufumi Kasuya, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,440

(22) Filed: Apr. 28, 1999

(30) Foreign Application Priority Data

Apr. 28, 1998 (JP) .......................................... 10-118789

(51) Int. Cl.[7] ................................................ H04J 3/06
(52) U.S. Cl. ...................... 370/522; 370/516; 370/522; 370/324; 370/350; 375/354; 375/355; 375/362; 375/373
(58) Field of Search ................................ 370/503, 516, 370/517, 518, 522, 324, 350; 375/354, 355, 362, 373

(56) References Cited

U.S. PATENT DOCUMENTS 4,860,285 A * 8/1989 Miller et al. ................ 370/507
5,384,806 A * 1/1995 Agazzi .......................... 375/8
5,946,358 A * 8/1999 Horimoto .................... 375/316
5,978,369 A * 11/1999 Silvestre et al. ............ 370/350
6,154,508 A * 11/2000 Ott .............................. 375/354

\* cited by examiner

*Primary Examiner*—Douglas Olms
*Assistant Examiner*—Van Nguyen
(74) *Attorney, Agent, or Firm*—Sughrue Mion, PLLC

(57) ABSTRACT

This invention intends to provide a correction method for synchronization between an air side and a network side of a PHS cell station. The correction method and apparatus enables a continued conversation without losing a PHS personal station with which a PHS cell station is communicating when the cell station is connected to an ISDN network. To achieve this object, the correction is executed not until after the synchronization between the air side and the network side. The divider circuit for air and a divider circuit for synchronization change a dividing ratio depending on a phase difference signal. The divider circuit for air always operates regardless of the connection to the ISDN network. A phase lock loop circuit of the invention accepts an input from two divider circuits. The synchronization process is not started until a connection between the ISDN network and the personal station is assured.

11 Claims, 4 Drawing Sheets

S81, S91 1.6KHz CLOCK
(FOR PHASE COMPARISON)

CORRECTION METHOD FOR CLOCK SYNCHRONIZATION WITH ISDN IN CELL STATION FOR USE IN PRIVATE-NETWORK-USE PHS AND A CIRCUIT THEREFOR

BACKGROUND OF THE INVENTION

1. Field of the Invention

The present invention relates to a correction method for synchronization with ISDN (Integrated Service Digital Network) in cell station system for use in a private-network-use PHS (personal handy-phone system) and a circuit therefor, in premises for example, and more particularly to a correction method for synchronization with ISDN. capable of preventing missing out of a personal station when the cell station is connected to the ISDN and a circuit therefor.

2. Description of Related Art

In the private-network-use PHS, its cell station is connected to the ISDN depending on the case. When it is not connected to the ISDN, the cell station is required to itself send a super frame which is a signal for capturing a personal station. Further, upon connecting the cell station to the ISDN, the cell station system is required to extract a clock from a network or the ISDN and obtain synchronization between the clock of the network side and a clock of the air side so as to transmit the super frame at a timing of the network side. The air side is a radio section between the PHS cell station and PHS personal station.

For a conversation through the ISDN in premises, generally, the speech path is connected to the ISDN only during a conversation, and after the conversation ends, connection with the ISDN is canceled. That is, after the conversation ends, no network clock is extracted from the ISDN. Therefore, synchronization with the network is lost and if a conversation is intended again, it is necessary to attain synchronization with the network again.

In a conventional PHS cell station system, a phase comparator circuit and a dividing/synchronization correction circuit are connected in series so as to generate a clock for air. The phase comparator circuit receives the clock for air to be outputted to the air side and a clock for the network side for phase comparison and compares them so as to output a phase difference signal. And a dividing/synchronization correction circuit corrects the clock synchronization for air generated by dividing the master clock in accordance with that phase difference signal.

In such a structure, the clock for air and the clock for the network side are connected directly to the input. Therefore, upon connecting the cell station to the ISDN, at an instant when it is connected to the ISDN, synchronization with the network is carried out. However, if synchronization with the network side is carried out at the instant when it is connected to the ISDN, in the cell station, the phase of a clock for air on current use for communication with the air may deviate. In such a case as to deviate, the cell station is missed out a personal station with which is communicating through the air, thereby communication between the cell station and personal station being broken.

A public use cell station has solved this problem by using a phase locked loop (PLL) circuit having a longer time constant. However, because, in the private-network-use communication apparatus, setting of connection with the ISDN and cancellation of the connection therewith are frequently repeated, a function for enabling a start of communication immediately after connection is established is set therein. Use of the PLL circuit having a longer time constant is not suitable for conditions of the private-network-use PHS.

SUMMARY OF THE INVENTION

Accordingly, it is an object of the present invention to provide a correction method for synchronization with ISDN in cell station system for use in private-network-use PHS, capable of solving the above described problems and a circuit therefor.

According to the correction method for use in the private-network-use PHS of the present invention, after synchronization between air side and between ISDN side is assured based on a master clock, the clock synchronization is commenced a correction depending on a phase difference detected by comparing phases thereof.

Thus, a correction circuit according to the present invention comprises: a permission signal generator circuit, a cancellation signal generator circuit, a divider circuit for air, a divider circuit for synchronization, a network side divider circuit, and a phase comparator circuit.

The permission signal generator circuit generates a correction permission signal for network synchronization by connection with ISDN. The cancellation signal generator circuit outputs a reset cancellation signal for network synchronization synchronously with a master clock in the system if a clock is extracted from ISDN after it receives the correction permission signal from the permission signal generator circuit. The divider circuit for air operates regardless of a connection state with the ISDN for dividing the master clock of the system to output a clock for air, the outputted dividing ratio being changed depending on a phase difference signal to be generated elsewhere. The divider circuit for synchronization divides the master clock to a predetermined frequency by receiving a reset cancellation signal from the cancellation signal generator circuit. The network side divider circuit divides a clock extracted from the ISDN to the predetermined frequency by receiving a reset cancellation signal from the cancellation signal generator circuit. And a phase comparator circuit detects a phase difference between an outputted clock of the divider circuit for synchronization and an outputted clock of the network side divider circuit when the correction permission signal is outputted from the permission signal generator circuit so as to output the phase difference signal.

With such a circuit structure, when the cell station is connected to the ISDN and clock synchronization correction is permitted, the divider circuit for synchronization and network side divider circuit respectively for generating a clock for phase comparison for synchronization correction can start their dividing operation at the same timing. That is, in case of being frequently connected to the ISDN for each conversation like the cell station for use in the private-network-use PHS, clock synchronization correction is started in a condition in which synchronization between the air side and ISDN side is assured. Thus, there never occurs a happening in which air side clock is disturbed when the cell station is connected to the ISDN. Therefore, the cell station never misses out its personal station during a communication therewith.

DESCRIPTION OF THE PREFERRED EMBODIMENTS

Hereinafter, the embodiment of the present invention will be described with reference to the accompanying drawings.

Figure 1:
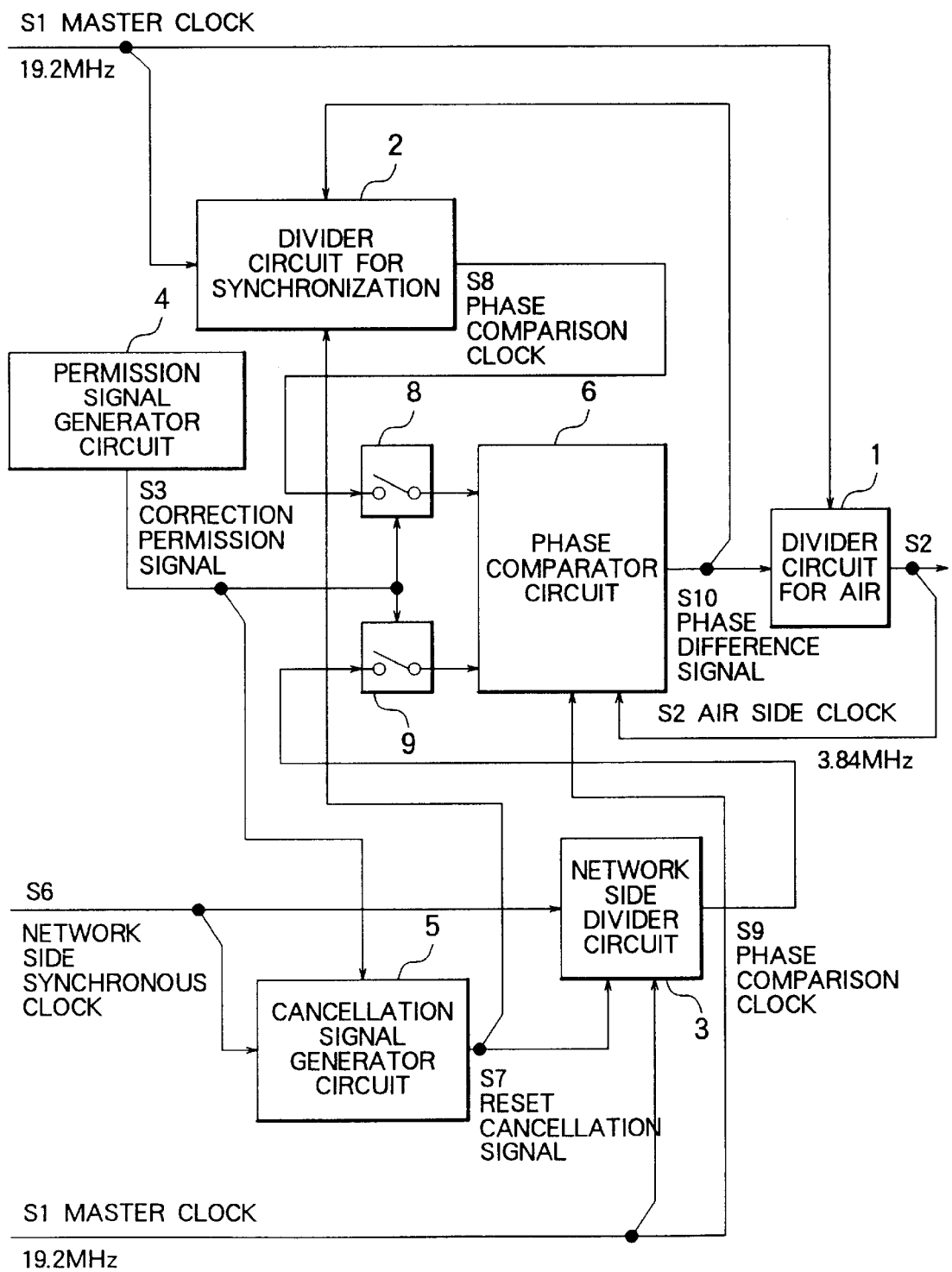
FIG. 1 is a circuit diagram showing a general embodiment of a synchronization correction circuit of the present invention.

Referring to FIG. 1, a clock synchronization correction circuit according to a general embodiment of the present invention comprises a divider circuit 1 for air, a divider circuit 2 for synchronization, a network side divider circuit 3, a permission signal generator circuit 4, a cancellation signal generator circuit 5, a phase comparator circuit 6, and switches 8, 9.

Each of the divider circuit 1 for air and the divider circuit 2 for synchronization divides a master clock S1 of 19.2 MHz oscillated from an oscillator (not shown) contained in system. The divider circuit 1 for air divides the master clock regardless of a connection state with ISDN so as to output an air side clock S2 of 3.84 MHz to the air. The divider circuit 2 for synchronization performs dividing operation for outputting a phase comparison clock S8 of a predetermined frequency only when it receives a reset cancellation signal S7 for network synchronization from the cancellation signal generator circuit 5 which is connected to ISDN to receive a correction permission for network synchronization via a correction permission signal S3. The network side divider circuit 3 receives a network side synchronous clock S6 extracted from network side when it is connected to ISDN and carries out dividing operation for outputting a phase comparison clock S9 of a predetermined frequency only when it receives a reset cancellation signal S7.

The permission signal generator circuit 4 is connected to ISDN and generates the correction permission signal S3 for network synchronization when network synchronization correction is set to permission. The correction permission signal S3 is inputted to the cancellation signal generator circuit 5 and the switches 8 and 9. The switches 8, 9 are turned "ON" by the correction permission signal S3 so that the phase comparator circuit 6 receives phase comparison clocks S8, S9 from the divider circuit 2 for synchronization and the network side divider circuit 3 respectively. Receiving the correction permission signal S3, the cancellation signal generator circuit 5 generates the reset cancellation signal S7 synchronously with the network side synchronous clock S6 of the ISDN for cancellation of network synchronization reset.

The reset cancellation signal S7 is inputted to the divider circuit 2 for synchronization and the network side divider circuit 3. The divider circuit 2 for synchronization and the network side divider circuit 3 are released from being reset by an input of the reset cancellation signal S7, so that the phase comparison clocks S8, S9 of the same frequency are outputted to the phase comparator circuit 6.

The phase comparator circuit 6 detects a difference of phase between the phase comparison clocks S8 and S9 and outputs a detection result to the divider circuit 1 for air and the divider circuit 2 for synchronization as phase difference signal S10. The divider circuit 1 for air and the divider circuit 2 for synchronization change dividing ratio depending on the phase difference signal S10 to be inputted. That is, an operation of the synchronization correction circuit is executed so that in case where the result of the phase comparison is "late", the dividing ratio is decreased and in case where the result of the phase comparison is "advanced", the dividing ratio is increased.

Next, referring to FIG. 2, a clock synchronization correction circuit according to a first embodiment of the present invention will be described. Components of the first embodiment shown in FIG. 2 have reference numerals consisting of the reference numerals attached to the components of FIG. 1 and "0", that is, "X0".

Figure 2:
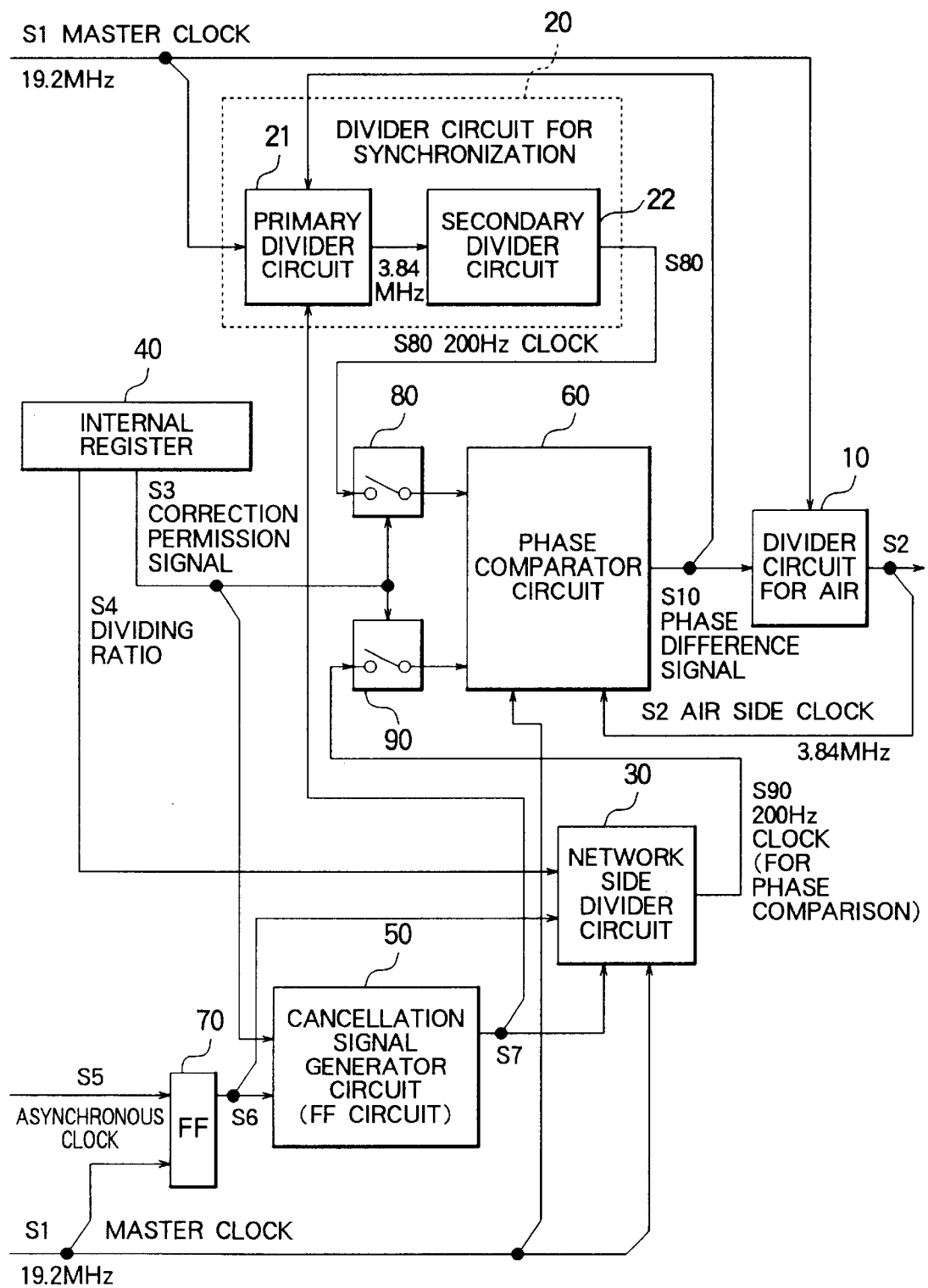
FIG. 2 is a circuit diagram showing a first embodiment of the synchronization correction circuit of the present invention.

The structure of FIG. 2 is different from the structure of FIG. 1 in the followings. That is, an internal resistor 40 and a flip-flop circuit (hereinafter referred to as FF) 70 are added, and the phase comparison clocks S8, S9 are changed into 200 Hz clock S80, S90 having a predetermined frequency of 200 Hz. The internal resistor 40, instead of the permission signal generator circuit 4, generates correction permission signal S3 and dividing ratio signal S4. And the 200 Hz clock S80, S90 are divided by the divider circuit 20 for synchronization and the network side divider circuit 30 respectively.

The divider circuit 20 for synchronization according to the first embodiment comprises a primary divider circuit 21 and a secondary divider circuit 22. The primary divider circuit 21 divides the master clock S1 of 19.2 MHz by five so as to generate a clock of 3.84 MHz and this dividing ratio is changed depending on the phase difference signal S10. The secondary divider circuit 22 divides the clock of 3.84 MHz by 19,200 so as to generate 200 Hz clock S80. This clock frequency 200 Hz is the same frequency as the 200 Hz clock S90 for phase comparison outputted by the network side divider circuit 30.

Figure 3:
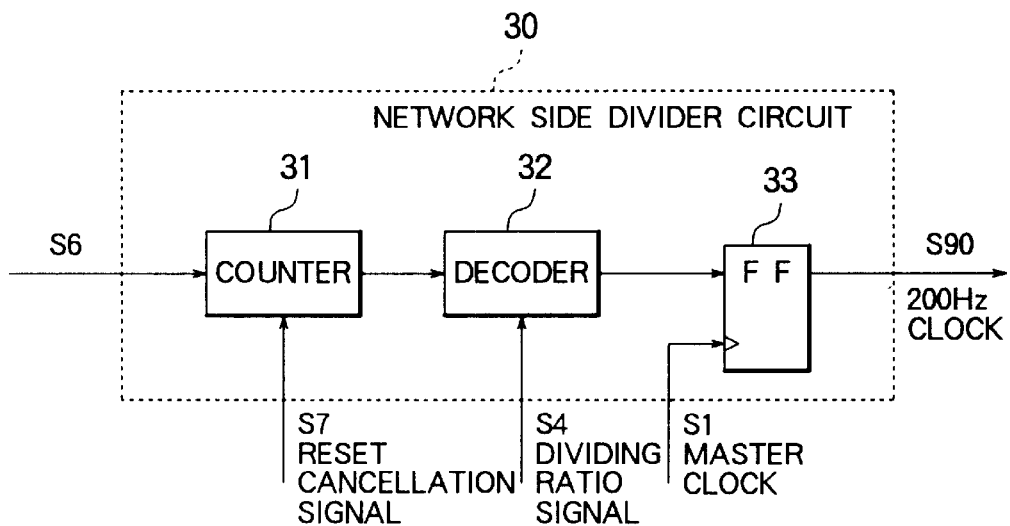
FIG. 3 is a circuit diagram showing a detail of a network side divider circuit according to the first embodiment of the present invention.

FIG. 3 illustrates the network side divider circuit 30 in detail.

As illustrated in FIG. 3, the network side divider circuit 30 comprises a counter 31, a decoder 32 and a FF 33. The counter 31 is a base 960 counter for counting the network side synchronous clock S6 of the ISDN from "0" to "959". In this embodiment, the frequency of the network side synchronous clock S6 to be outputted from the FF 70 by synchronizing the network side asynchronous clock S5 of the ISDN with the master clock S1 is scheduled to be 8 KHz, 64 KHz or 192 KHz. The decoder 32 decodes a count value to an output clock of 200 Hz depending on the dividing ratio signal S4 received from the internal resistor 40. The decoded signal is outputted as 200 Hz clock S90 synchronous with a rise-up of the master clock S1.

The network side divider circuit 30 receives the master clock S1 to prevent an occurrence of timing error inside.

When the internal resistor 40 is connected to the ISDN as described above, it outputs the correction permission signal 83 for network synchronization obtained from the ISDN and the dividing ratio signal S4. The dividing ratio of the dividing ratio signal S4 is not changed until connection with the network is released.

The cancellation signal generator circuit 50 is constituted of only the FF circuit and synchronizes the correction permission signal S3 for synchronization with the network, with the network side synchronous clock S6 so as to output it as the reset cancellation signal S7 for network synchronization. The network side synchronous clock S6 receives from the FF 70.

The phase comparator circuit 60 detects a deviation of phase by using a single clock of the master clock S1 as a minimum resolution. Further, because the phase comparator circuit 60 outputs the phase difference signal S10 synchronously with the air side clock S2, the master clock S1 and the air side clock S2 are inputted therein.

The FF 70 outputs the network side synchronous clock S6 by synchronizing the network side asynchronous clock S5 with the master clock S1.

When each of the switches 80, 90 is receiving the correction permission signal S3, those switches 80, 90 are closed so as to connect outputs of the divider circuit 20 for synchronization and network side divider circuit 30 respectively to the phase comparator circuit 60.

An operation of this embodiment will be described with reference to FIGS. 4 and 2.

Figure 4:
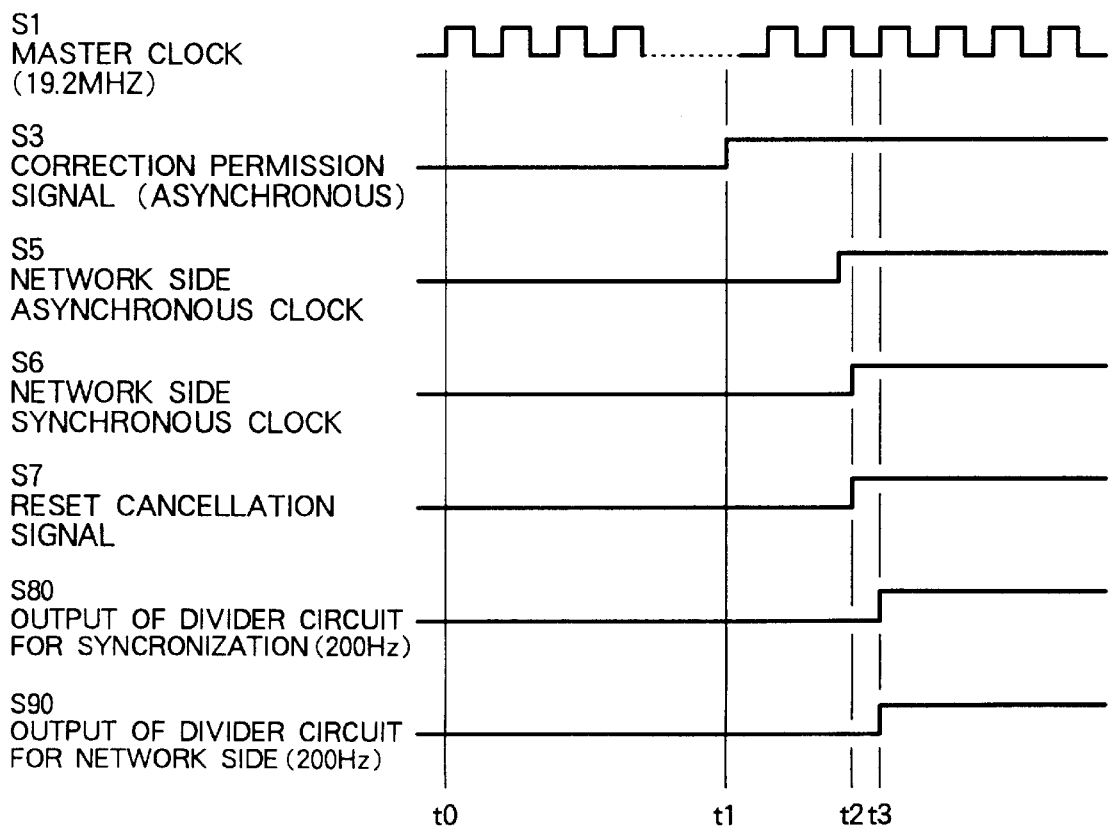
FIG. 4 is a timing chart according to the first embodiment of the present invention.

Referring to FIG. 4, the correction permission signal S3 is off in a time interval from t0 to t1 so that correction of network synchronization is not permitted. Therefore, the reset cancellation signal S7 for network synchronization outputted by the cancellation signal generator circuit 50 is off, so that the divider circuit 20 for synchronization and the network side divider circuit 30 are reset.

Network synchronization correction permission is set in the internal resistor t0 at time t1 and when the correction permission signal S3 is generated, the switches 80, 90 are closed. As a result, a preparation for inputting the 200 Hz clock S80 from the divider circuit 20 for synchronization and the 200 Hz clock S90 from the network side divider circuit 30 into the phase comparator circuit 60 as a control clock and a reference clock respectively is made.

Next, when the network side synchronous clock S6 is outputted from the FF 70 at time t2, the reset cancellation signal S7 is outputted by the cancellation signal generator circuit 50 so as to cancel the resetting of the network synchronization. As a result, the divider circuit 20 for synchronization and the network side divider circuit 30 rise up at the same time at a rise-up time t3 of the master clock S1 to output 200 Hz clocks S80, S90.

The phase comparator circuit 60 compares phases of both the 200 Hz clocks S80, S90. Because the 200 Hz clocks S80, S90 rise up simultaneously at time t3, there is no difference of phase between the air side and network side. Therefore, the air side and network side can start clock synchronization correction from a synchronized state.

Another embodiment of the synchronization correction circuit of the present invention will be described with reference to FIGS. 5 and 2.

Figure 5:
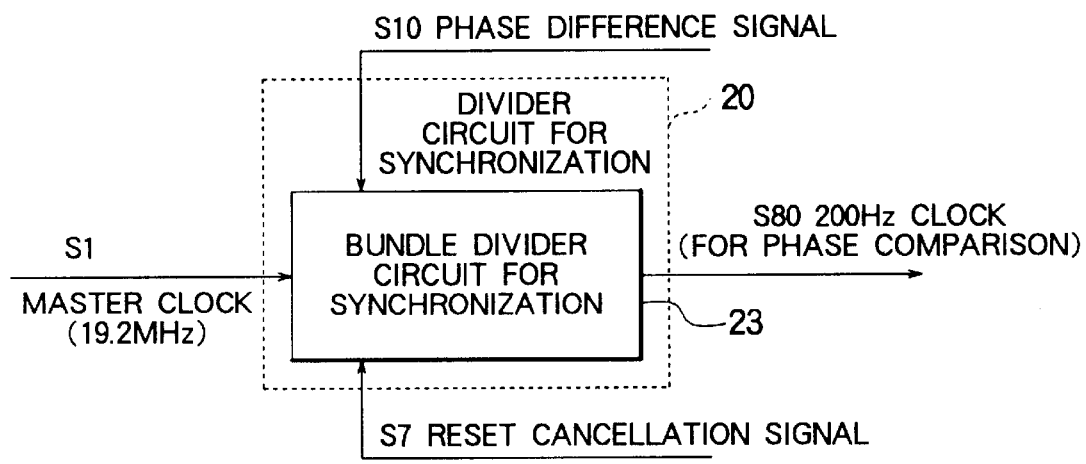
FIG. 5 is a circuit diagram showing a second embodiment of the synchronization correction circuit in which only a divider circuit for synchronization of the first embodiment is changed.

In FIG. 5, this synchronization correction circuit is different from the synchronization correction circuit described above in the divider circuit 20 for synchronization. The divider circuit 20 for synchronization is constituted of only a bundle divider circuit 23 for synchronization for generating necessary 200 Hz clock S80 directly from the master clock S1 of 19.2 MHz. In the bundle divider circuit 23 for synchronization according to this embodiment, the dividing ratio is changed depending on the phase difference signal S10 outputted by the phase comparator circuit 60 and the 200 Hz clock S80 of a necessary frequency is outputted. Because generation of intermediate frequency like 3.84 MHz is not required, the circuit structure is simplified.

Still another embodiment of the synchronization correction circuit of the present invention will be described with reference to FIGS. 6 and 2.

Figure 6:
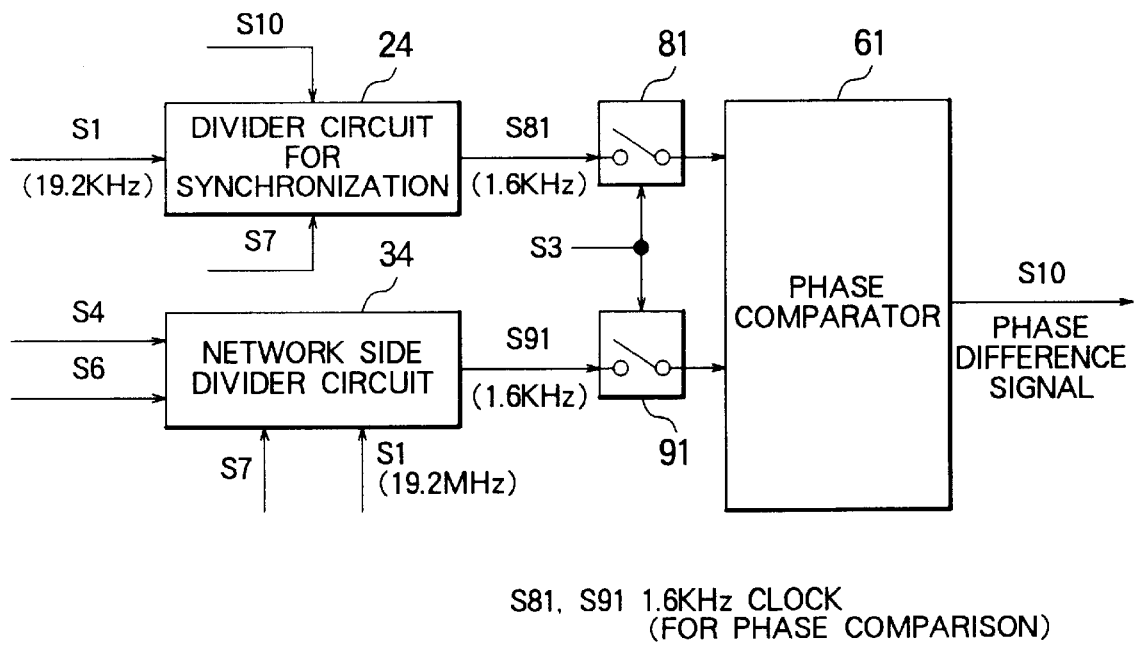
FIG. 6 is a partial circuit diagram showing a third embodiment of the synchronization correction circuit of the present invention.

In FIG. 6, this synchronization correction circuit is different from the synchronization correction circuit described above in the predetermined frequency of the phase comparison clock. That is, outputs of a divider circuit 24 for synchronization and a network side divider circuit 34 are 1.6 KHz clocks S81, S91 having a frequency of 1.6 KHz (625 µs, 1 slot cycle) which is eight times faster than 200 Hz.

Further, such a phase comparison clock to be inputted to the phase comparator circuit may be set to 1/0.625 n KHz (n: natural number). That is, the time cycle for clock synchronization correction can be reduced by such faster phase comparison clock.

The present invention has been described based on the functional blocks above. However, a change of the block structure by separation or joining of the functions is permitted as long as the above-described functions are satisfied and the above description does not restrict the present invention to a particular embodiment.

As described above, the present invention has the following effects.

Firstly, in case where a function for connecting to the ISDN is available only during a conversation like the cell station for use in the private-network-use PHS, synchronization correction is not started until synchronization between the air side and ISDN side is assured. Therefore, the PHS cell station is capable of continuing a conversation without losing a PHS personal station with which the PHS cell station is communicating when it is connected to the ISDN.

Secondly, because synchronization between the air side and network side can be assured in a shorter time than in case of assuring complete synchronization with the PLL circuit, the present invention is effective in case where setting or canceling the connection with the ISDN is repeated in a short time as realized in the cell station for use in the private-network-use PHS. Particularly by raising the frequency of the phase comparison clock, synchronization correction in a shorter time cycle can be achieved.

What is claimed is:

1. A correction circuit for clock synchronization with ISDN in cell station for use in private-network-use PHS comprising:

a permission signal generator circuit for generating a correction permission signal for network synchronization by connection with ISDN;

a cancellation signal generator circuit for outputting a reset cancellation signal for network synchronization synchronously with a master clock in said system if a clock is extracted from ISDN after it receives the correction permission signal from said permission signal generator circuit;

a divider circuit for air operating regardless of a connection state with the ISDN for dividing the master clock of said system to output a air side clock, the outputted dividing ratio being changed depending on a phase difference signal to be generated elsewhere;

a divider circuit for synchronization for dividing said master clock to a predetermined frequency by receiving a reset cancellation signal from said cancellation signal generator circuit, the dividing ratio being changed according to said phase difference signal;

a network side divider circuit for dividing a clock extracted from the ISDN to said predetermined frequency by receiving a reset cancellation signal from said cancellation signal generator circuit; and a phase comparator circuit for detecting a phase difference between an outputted clock of said divider circuit for synchronization and an outputted clock of said network side divider circuit when the correction permission signal is outputted from said permission signal generator circuit so as to output said phase difference signal.

2. A correction circuit for clock synchronization with ISDN in cell station for use in private-network-use PHS as claimed in claim 1 wherein said divider circuit for synchronization comprises:

a primary divider circuit for dividing said master clock to a predetermined primary frequency, the dividing ratio being changed depending on said phase difference signal; and a secondary divider circuit for dividing an outputted clock of the primary divider circuit to said predetermined frequency.

3. A correction circuit for clock synchronization with ISDN in cell station for use in private-network-use PHS as claimed in claim 1 wherein said network side divider circuit comprises:

a counter for counting clocks extracted from ISDN;

a decoder for decoding a count value of said counter to clocks of said predetermined frequency depending on a predetermined dividing ratio between a frequency of network clock and said predetermined frequency; and a flip-flop circuit for outputting a decoded value of said decoder synchronously with said master clock.

4. A correction circuit for clock synchronization with ISDN in cell station for use in private-network-use PHS as claimed in claim 1 further comprising switches for connecting outputted clocks of said divider circuit for synchronization and said network side divider circuit to said phase comparator circuit when said correction permission signal is received.

5. A correction circuit for clock synchronization with ISDN in cell station for use in private-network-use PHS as claimed in claim 1 wherein said predetermined frequency of a phase comparison clock to be inputted to said phase comparator circuit is set to 1/0.625n KHz (n: natural number).

6. A correction method for clock synchronization with ISDN in a cell station for use in private-network-use PHS comprising:

generating a correction permission signal after connection with the ISDN;

generating a reset cancellation signal for network synchronization with a master clock if a clock signal is extracted from the ISDN after the correction permission signal is generated;

generating an air side clock based on the master clock, regardless of whether or not the correction permission signal is generated;

generating a first intermediate signal from the master clock after receiving the reset cancellation signal, wherein the first intermediate signal is generated based on a dividing ratio;

generating a second intermediate signal based on the clock signal extracted from the ISDN after receiving the reset cancellation signal;

detecting a phase difference between the first intermediate signal and the second intermediate signal after the correction permission signal is generated; and changing the dividing ratio based on the phase difference.

7. The method as claimed in claim 6, wherein the first intermediate signal has a predetermined frequency and the second intermediate signal has the predetermined frequency.

8. The method as claimed in claim 7, further comprising:

dividing an output clock having a predetermined primary frequency by dividing the master clock based on the dividing ratio; and dividing the output clock to produce to said first intermediate signal.

9. The method as claimed in claim 7, further comprising:

counting the pulse of the clock extracted from the ISDN to produce a count value;

decoding the count value to produce the second intermediate signal having said predetermined frequency based on a dividing ratio between a frequency of a network clock and the predetermined frequency; and outputting the second intermediate signal synchronously with said master clock.

10. The method as claimed in claim 7, further comprising:

outputting said first intermediate signal and said second intermediate signal to a phase comparator circuit when said correction permission signal is generated.

11. The method as claimed in claim 7, further comprising:

setting said predetermined frequency of said first intermediate signal to 1/0.625n, where n is a natural number.

* * * * *

UNITED STATES PATENT AND TRADEMARK OFFICE
CERTIFICATE OF CORRECTION

PATENT NO. : 6,556,592 B1
DATED : April 29, 2003
INVENTOR(S) : Nobufumi Kasuya

It is certified that error appears in the above-identified patent and that said Letters Patent is hereby corrected as shown below:

Column 5,
Line 25, delete "t0" insert -- 40 --

Signed and Sealed this

Second Day of September, 2003

JAMES E. ROGAN
*Director of the United States Patent and Trademark Office*